United States Patent
Otsubo

(10) Patent No.: US 11,938,986 B2
(45) Date of Patent: Mar. 26, 2024

(54) CONTROL DEVICE FOR RAILWAY VEHICLES AND DISCONNECTION DETERMINATION METHOD

(71) Applicant: Mitsubishi Electric Corporation, Tokyo (JP)

(72) Inventor: Michio Otsubo, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 747 days.

(21) Appl. No.: 17/054,584

(22) PCT Filed: Jul. 4, 2018

(86) PCT No.: PCT/JP2018/025408
§ 371 (c)(1),
(2) Date: Nov. 11, 2020

(87) PCT Pub. No.: WO2020/008575
PCT Pub. Date: Jan. 9, 2020

(65) Prior Publication Data
US 2021/0086804 A1    Mar. 25, 2021

(51) Int. Cl.
*B60T 8/17*     (2006.01)
*B60L 9/18*     (2006.01)
*B61L 3/00*     (2006.01)

(52) U.S. Cl.
CPC ............. *B61L 3/008* (2013.01); *B60L 9/18* (2013.01); *B60L 2200/26* (2013.01); *B60L 2240/423* (2013.01)

(58) Field of Classification Search
CPC ........ B61L 3/008; B60L 9/18; B60L 2200/26; B60L 2240/423; Y02T 10/64; B60T 8/1705; B60T 8/17

(Continued)

(56) References Cited

U.S. PATENT DOCUMENTS

2012/0112669 A1* 5/2012 Kitanaka ............... B60L 50/51
                                                        318/3
2015/0295448 A1* 10/2015 Sugeno ................. B60L 58/16
                                                        320/136

(Continued)

FOREIGN PATENT DOCUMENTS

DK    1985490 T3    10/2008
EP    3343757 A1    7/2018

(Continued)

OTHER PUBLICATIONS

Office Action dated Feb. 23, 2021 in corresponding Indian Patent Application No. 202027046155 (6 pages).

(Continued)

*Primary Examiner* — Shardul D Patel
(74) *Attorney, Agent, or Firm* — BUCHANAN INGERSOLL & ROONEY PC

(57) ABSTRACT

A control device includes a changing rate calculator, a first threshold calculator, and a separation determiner. The control device determines whether a current collector is separate from a power line, in a power conversion system in which a power converter converts power supplied from the current collector to the primary side of the power converter into alternating-current (AC) power and supplies the AC power to a motor connected to the secondary side of the power converter. The changing rate calculator calculates a changing rate of the voltage at the primary side of the power converter. The first threshold calculator calculates a first threshold having the absolute value positively correlated with an output power from the power converter. The separation determiner compares the changing rate with the first threshold and determines whether the current collector is separate from the power line.

20 Claims, 13 Drawing Sheets

(58) Field of Classification Search
USPC .............................................................. 701/2
See application file for complete search history.

(56) References Cited

U.S. PATENT DOCUMENTS

| | | | | |
|---|---|---|---|---|
| 2017/0326990 | A1* | 11/2017 | Tokito | ..................... B60L 58/27 |
| 2018/0222328 | A1* | 8/2018 | Tokito | ..................... B60L 50/13 |
| 2018/0234010 | A1* | 8/2018 | Uemura | .............. H02M 3/1584 |
| 2020/0171957 | A1* | 6/2020 | Otsubo | ................. H02H 9/001 |

FOREIGN PATENT DOCUMENTS

| | | |
|---|---|---|
| EP | 1985490 B1 | 6/2019 |
| JP | 2015015819 A | 1/2015 |
| TW | I408070 B | 9/2013 |
| WO | 2017037795 A1 | 3/2017 |
| WO | 2018225137 A1 | 12/2018 |

OTHER PUBLICATIONS

International Search Report (PCT/ISA/210), with translation, and Written Opinion (PCT/ISA/237) dated Oct. 9, 2018, by the Japan Patent Office as the International Searching Authority for International Application No. PCT/JP2018/025408.

* cited by examiner

CONTROL DEVICE FOR RAILWAY VEHICLES AND DISCONNECTION DETERMINATION METHOD

TECHNICAL FIELD

The present disclosure relates to a control device for a railway vehicle and a method of determining separation.

BACKGROUND ART

Electric railway vehicles are equipped with current collectors such as pantographs and contact shoes, which come into contact with power lines such as overhead wires and third rails and thereby obtain electric power. The electric railway vehicles are also equipped with power conversion systems, which convert the electric power obtained by the current collectors into alternating-current (AC) power and supply the AC power to AC motors. The AC motors supplied with the AC power are driven to provide thrust to the electric railway vehicles. A typical example of the power conversion systems is disclosed in Patent Literature 1. The power conversion system disclosed in Patent Literature 1 includes a power conversion device and a control device. The power conversion device includes an inverter and a control device for controlling the inverter. The inverter converts electric power supplied from a current collector connected to the primary terminal into AC power and supplies the AC power to a motor connected to the secondary terminal.

When the current collector is separate from a power line, the current collector cannot obtain electric power, resulting in no power supply to the inverter. This decreases the voltage at the primary terminal of the inverter. When the current collector comes into contact with the power line again after the separation, the voltage at the primary terminal of the inverter may suddenly increase, thereby generating an inrush current to the inverter. Thus, the power conversion system disclosed in Patent Literature 1 determines that the current collector is separate from the power line when the decreasing rate of the voltage at the primary terminal of the inverter is lower than a first threshold and equal to or higher than a second threshold. When determining the current collector to be separate from the power line, the power conversion system reduces the output current from the inverter so as to suppress a decrease in the voltage at the primary terminal of the inverter. The suppression in a decrease in the voltage at the primary terminal of the inverter suppresses a sudden increase in the voltage at the primary terminal of the inverter that is caused by recontact of the current collector with the power line, and also suppresses an inrush current caused by the recontact.

CITATION LIST

Patent Literature

Patent Literature 1: Unexamined Japanese Patent Application Publication No. 2015-15819

SUMMARY OF INVENTION

Technical Problem

The first and second thresholds used in the power conversion system disclosed in Patent Literature 1 are fixed values. In contrast, the decreasing rate of the voltage at the primary terminal of the inverter is not constant but varies depending on a variation in the actual power consumption of the motor. The first and second thresholds must therefore have a large difference in view of a variation in the decreasing rate, so as to certainly detect separation of the current collector from the power line, in the control system for a railway vehicle disclosed in Patent Literature 1. However, the first and second thresholds having a large difference may lead to an error in determination. That is, the current collector may be erroneously determined to be separate from the power line despite of no separation of the current collector from the power line. In other words, the accuracy of determination whether the current collector is separate from the power line may be insufficient.

The present disclosure is made in view of the above circumstances, and an objective of the present disclosure is to improve the accuracy of determination whether the current collector is separate from the power line in a control device for a railway vehicle and a method of determining separation.

Solution to Problem

In order to achieve the above objective, a control device for a railway vehicle according to an aspect of the present disclosure determines whether a current collector is separate from a power line, in a power conversion system in which a power converter converts electric power supplied from the current collector to the primary side of the power converter and supplies the converted power to a motor connected to the secondary side of the power converter. The control device for a railway vehicle is equipped with a changing rate calculator, a first threshold calculator, and a separation determiner. The changing rate calculator obtains a voltage at the primary side of the power converter and calculates a changing rate of the voltage at the primary side. The first threshold calculator calculates, using a physical quantity that is positively correlated with an output power from the power converter and varies with time in response to a time variation in the output power, a first threshold having the absolute value positively correlated with the physical quantity and varying with time in response to a time variation in the physical quantity. The separation determiner compares the changing rate with the first threshold and determines whether the current collector is separate from the power line.

Advantageous Effects of Invention

The present disclosure includes (i) calculating, using a physical quantity that is positively correlated with an output power from the power converter and varies with time in response to a time variation in the output power, a first threshold having the absolute value positively correlated with the physical quantity and varying with time in response to a time variation in the physical quantity, (ii) comparing the changing rate of the voltage at the primary side of the power converter with the first threshold, and (iii) determining whether the current collector is separate from the power line. This improves the accuracy of determination whether the current collector is separate from the power line in the control device for a railway vehicle and the method of determining separation.

DESCRIPTION OF EMBODIMENTS

A control device for a railway vehicle and a method of determining separation according to embodiments of the present disclosure are described in detail with reference to the drawings. Components that are the same or equivalent are assigned the same reference signs throughout the drawings.

Embodiment 1

Figure 1:
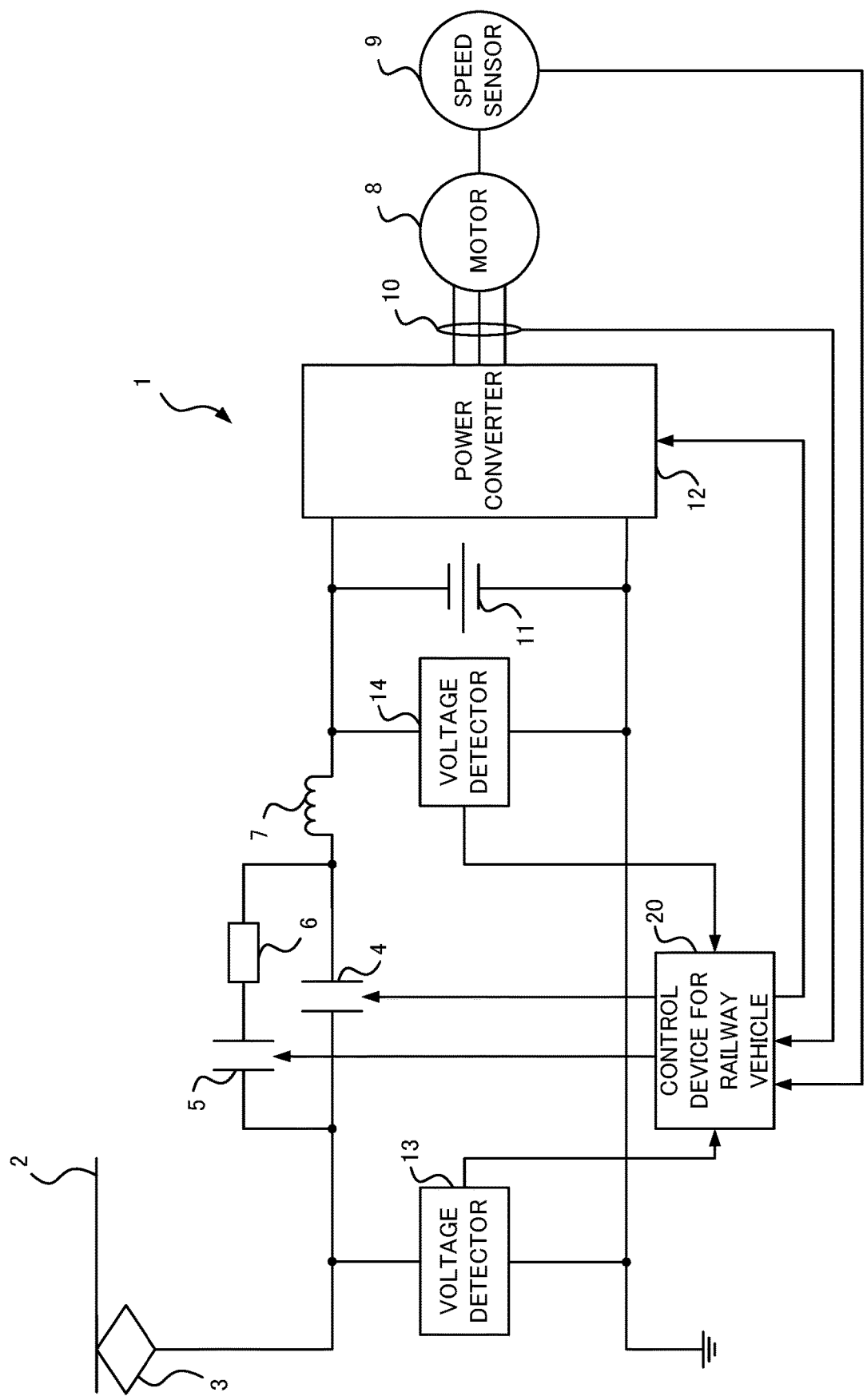
FIG. 1 is a block diagram illustrating a configuration of a power conversion system according to Embodiment 1 of the present disclosure.

An electric railway vehicle is equipped with a power conversion system 1 for a railway vehicle (hereinafter referred to as "power conversion system 1") according to Embodiment 1 of the present disclosure, as illustrated in FIG. 1. The power conversion system 1 receives operation commands from a cab of the electric railway vehicle. The operation commands include a power running command for instructing the electric railway vehicle to increase the speed and a braking command for instructing the electric railway vehicle to decrease the speed. In detail, the power running command indicates a target acceleration for the electric railway vehicle while the braking command indicates a target deceleration for the electric railway vehicle. In the case where the operation commands include the power running command, that is, in the case of power running, the power conversion system 1 obtains direct-current (DC) power from a non-illustrated substation, which is an exemplary DC power source, via an overhead wire 2, which is an exemplary power line. The power conversion system 1 converts this DC power into desired alternating-current (AC) power and supplies the AC power to a motor 8, thereby driving the motor 8. The driven motor 8 provides thrust to the electric railway vehicle.

The power conversion system 1 is equipped with a pantograph 3, which is an exemplary current collector, for obtaining DC power from the substation via the overhead wire 2, and a power converter 12 for converting electric power supplied from the primary side and supplying the converted power to the motor 8 via the secondary side. The power converter 12 converts DC power supplied from the primary side into AC power and supplies the AC power to the motor 8 connected to the secondary side. The power conversion system 1 is further equipped with a control device 20 for a railway vehicle (hereinafter referred to as "control device 20") for controlling the power converter 12 and contactors 4 and 5, which switch the electrical connection between the pantograph 3 and the power converter 12. The control device 20 not only conducts these controls but also determines whether the pantograph 3 is separate from the overhead wire 2.

At the start of running of the electric railway vehicle, the pantograph 3 ascends and comes into contact with the overhead wire 2. The control device 20 then closes the contactor 5 while keeping the contactor 4 open. The contactor 5 is connected in serial to a braking resistor 6. That is, electric power is supplied from the pantograph 3 via the contactor 5 and the braking resistor 6 to the power converter 12. This configuration suppresses an inrush current to the power converter 12. The control device 20 determines whether a voltage ES on the pantograph 3 side of the contactor 4, which is detected by a voltage detector 13 disposed closer to the pantograph 3 than the contactor 4, is equal to a voltage EFC at a filter capacitor 11 connected to the primary side of the power converter 12, which is detected by a voltage detector 14. When determining these voltages to be equal to each other, the control device 20 closes the contactor 4 and opens the contactor 5. During subsequent power running, the control device 20 controls the switching elements of the power converter 12 to cause the power converter 12 to convert DC power, which is supplied from the pantograph 3 via the contactor 4 and a smoothing reactor 7, into desired AC power. In detail, the control device 20 calculates a target torque for obtaining the target acceleration indicated by the power running command and also calculates an actual torque of the motor 8 based on the current flowing in the motor 8. The control device 20 then controls the operations of the switching elements of the power converter 12 such that the actual torque approaches the target torque. The motor 8 is a three-phase induction motor. The control device 20 obtains the values of phase currents flowing in the motor 8 by a current detector 10 for detecting currents in the U, V, and W phases flowing in the motor 8.

Furthermore, the control device 20 determines whether the pantograph 3 is separate from the overhead wire 2 during power running, based on the voltage at the primary side of the power converter 12, that is, the voltage at the filter capacitor 11 detected by the voltage detector 14. In detail, the control device 20 compares the absolute value of the changing rate of the voltage at the filter capacitor 11 with a first threshold having the absolute value positively correlated with the actual torque of the motor 8, and thereby determines whether the pantograph 3 is separate from the overhead wire 2. The control device 20 calculates an output power from the power converter 12 based on, for example, the rotational speed of the motor 8 provided by a speed sensor 9, the actual torque of the motor 8, and the efficiency of the motor 8, and then calculates a first threshold based on the output power from the power converter 12. The speed sensor 9 includes a pulse generator (PG) attached to the shaft of the motor 8, and calculates a rotational speed of the motor 8 based on pulse signals output from the PG. When the absolute value of the changing rate of the voltage at the filter capacitor 11 is less than the first threshold, the control device 20 determines that the pantograph 3 is not separate from the overhead wire 2, that is, the pantograph 3 is in contact with the overhead wire 2. In this case, the control device 20 controls the operations of the switching elements of the power converter 12 such that the actual torque approaches the target torque, as explained above.

When the absolute value of the changing rate of the voltage at the filter capacitor 11 is greater than or equal to the first threshold during power running, the control device 20 determines that the pantograph 3 is separate from the overhead wire 2. In this case, the control device 20 opens the contactor 4 to electrically disconnect the power converter 12 from the pantograph 3. Since the power converter 12 is electrically disconnected from the pantograph 3, the electric power obtained by the pantograph 3 is not supplied to the power converter 12 even when the pantograph 3 comes into contact with the overhead wire 2 again after separation from the overhead wire 2. The control of the control device 20 over the contactors 4 and 5 in the case of recontact of the pantograph 3 with the overhead wire 2 is identical to the above-explained control at the start of running of the electric railway vehicle. In the case of recontact, the control device 20 also closes the contactor 5 while keeping the contactor 4 open, as at the start of running of the electric railway vehicle. The electric power is thus supplied from the pantograph 3 via the contactor 5 and the braking resistor 6 to the power converter 12. This configuration suppresses an inrush current to the power converter 12.

Figure 2:
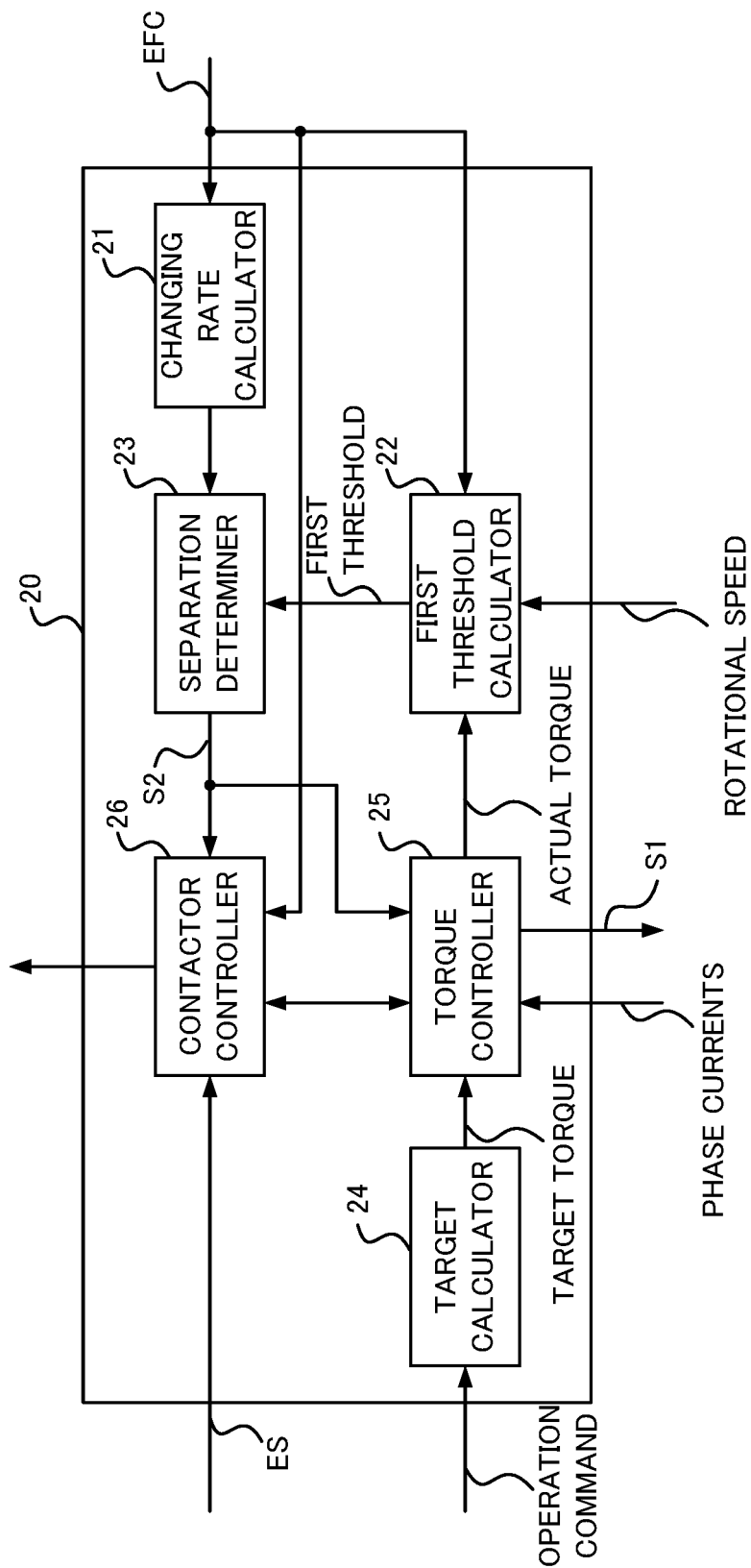
FIG. 2 is a block diagram illustrating a configuration of a control device for a railway vehicle according to Embodiment 1.

As illustrated in FIG. 2, the control device 20 includes a changing rate calculator 21 for calculating a changing rate of the voltage EFC at the filter capacitor 11, a first threshold calculator 22 for calculating a first threshold to be used in determination whether the pantograph 3 is separate from the overhead wire 2, and a separation determiner 23 for determining whether the pantograph 3 is separate from the overhead wire 2 based on the changing rate and the first threshold. The control device 20 further includes a target calculator 24 for calculating a target torque of the motor 8, a torque controller 25 for controlling operations of the switching elements of the power converter 12 based on the target torque and the actual torque, and a contactor controller 26 for closing or opening the contactors 4 and 5.

The schematic configuration of the individual components of the control device 20 is described. When the operation commands include a power running command after the start of running of the railway vehicle, the target calculator 24 calculates a target torque of the motor 8 required to achieve the target acceleration indicated by the power running command and transmits the calculated target torque to the torque controller 25. The torque controller 25 calculates an actual torque of the motor 8 based on the phase currents detected by the current detector 10. The torque controller 25 then controls the operations of the switching elements of the power converter 12 such that the actual torque approaches the target torque. The changing rate calculator 21 obtains the voltage EFC at the filter capacitor 11 from the voltage detector 14, and calculates a changing rate $\Delta EFC/\Delta T$ of the voltage EFC at the filter capacitor 11 by dividing the amount of change $\Delta EFC$ in the voltage EFC at the filter capacitor 11 per unit time $\Delta T$ by the unit time $\Delta T$. The first threshold calculator 22 calculates, using a physical quantity that is positively correlated with the output power from the power converter 12 and varies with time in response to a time variation in the output power, a first threshold having the absolute value positively correlated with the physical quantity and varying with time in response to a time variation in the physical quantity. In detail, the first threshold calculator 22 calculates an output power from the power converter 12 based on the actual torque of the motor 8 calculated by the torque controller 25 as the physical quantity, and then calculates a first threshold having the absolute value positively correlated with the output power and varying with time in response to a time variation in the output power.

Based on the changing rate $\Delta EFC/\Delta T$ and the first threshold, the separation determiner 23 determines whether the pantograph 3 is separate from the overhead wire 2. When the separation determiner 23 determines that the pantograph 3 is not separate from the overhead wire 2, the torque controller 25 controls the operations of the switching elements of the power converter 12 such that the actual torque approaches the target torque, as explained above. In contrast, when the separation determiner 23 determines that the pantograph 3 is separate from the overhead wire 2, the torque controller 25 reduces the target torque obtained from the target calculator 24 in a stepwise manner, and controls the operations of the switching elements of the power converter 12 such that the actual torque approaches the reduced target torque. The torque controller 25 reduces the target torque in a stepwise manner, as explained above, and finally turns off the switching elements of the power converter 12. When the separation determiner 23 determines that the pantograph 3 is separate from the overhead wire 2, the contactor controller 26 opens the contactor 4. At the start of running of the electric railway vehicle, when the pantograph 3 comes into contact with the overhead wire 2, the contactor controller 26 closes the contactor 5 while keeping the contactor 4 open. Then, when the voltage ES is deemed to be equal to the voltage EFC, the contactor controller 26 closes the contactor 5 and then opens the contactor 4.

Figure 3:
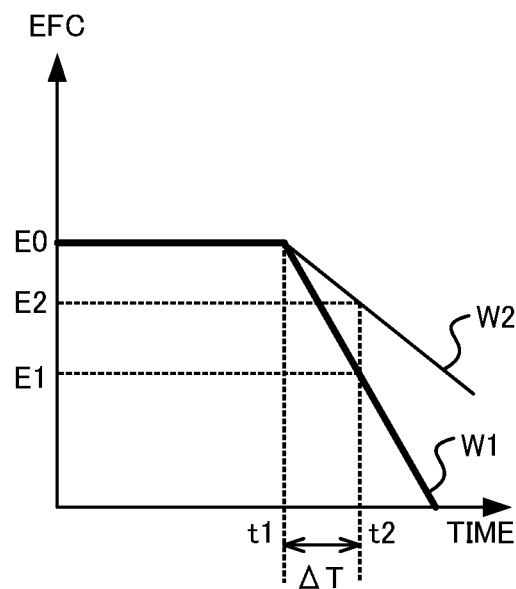
FIG. 3 illustrates exemplary voltages at the primary side in Embodiment 1.

The detailed configuration of the individual components of the control device 20 is described. The changing rate calculator 21 calculates a changing rate $\Delta EFC/\Delta T$ by dividing the amount of change $\Delta EFC$ in the voltage EFC at the filter capacitor 11 per unit time $\Delta T$ by the unit time $\Delta T$. The unit time $\Delta T$ is defined depending on the time available for the determination whether the pantograph 3 is separate from the overhead wire 2. For example, the unit time $\Delta T$ is several tens of milliseconds. In order to conduct this calculation, the changing rate calculator 21 is equipped with a time element relay, a difference detecting circuit, and a divider. The difference detecting circuit outputs the difference between the voltage EFC detected by the voltage detector 14 and the voltage EFC delayed by the unit time $\Delta T$ using the time element relay. The divider outputs the value calculated by dividing the output from the difference detecting circuit by the unit time $\Delta T$. The output from the divider corresponds to the changing rate $\Delta EFC/\Delta T$. The changing rate of the voltage EFC at the filter capacitor 11 varies depending on the output power from the power converter 12, as explained above. The change in the voltage EFC at the filter capacitor 11 is described with reference to FIG. 3. The example assumes that the pantograph 3 leaves the overhead wire 2 at time t1. The time after elapse of the unit time $\Delta T$ from the time t1 is defined as time t2. In FIG. 3, the horizontal axis indicates time and the vertical axis indicates the voltage EFC at the filter capacitor 11. The thick solid line represents the voltage EFC in the case of an output power of W1 while the thin solid line represents the voltage EFC in the case of an output power of W2 in FIG. 3. Here, W1 is higher than W2.

The voltage EFC at the filter capacitor 11 is E0 until the time t1. When the pantograph 3 leaves the overhead wire 2 at the time t1, the voltage EFC at the filter capacitor 11 starts decreasing from E0. In the case of an output power of W1, the voltage EFC at the filter capacitor 11 reaches E1 at the time t2. The changing rate $\Delta EFC/\Delta T$ is represented by $(E1-E0)/\Delta T$ at the time t2. In contrast, in the case of an output power of W2, the voltage EFC at the filter capacitor 11 reaches E2 at the time t2. Since the amount of change $\Delta EFC$ in the voltage at the filter capacitor 11 per unit time $\Delta T$ increases as the output power increases, E2 is higher than E1. The changing rate $\Delta EFC/\Delta T$ is represented by $(E2-E0)/\Delta T$ at the time t2. Because of the above-mentioned relationship of E2>E1, the absolute value $|(E1-E0)/\Delta T|$ is larger than the absolute value $|(E2-E0)/\Delta T|$. That is, the absolute value of the changing rate $\Delta EFC/\Delta T$ of the voltage EFC at the filter capacitor 11 increases as the output power increases. When the determination whether the pantograph 3 is separate from the overhead wire 2 is conducted based on comparison between the absolute value $|\Delta EFC/\Delta T|$ of the changing rate of the voltage at the filter capacitor 11 and a fixed threshold, an error may occur. In a possible example, although the pantograph 3 is determined to be separate from the overhead wire 2 in the case of an output power of W1, the pantograph 3 is determined not to be separate from the overhead wire 2 in the case of an output power of W2.

In order to avoid such an error, the control device 20 uses the first threshold having the absolute value positively correlated with the actual torque of the motor 8 to determine whether the pantograph 3 is separate from the overhead wire 2. The first threshold calculator 22 calculates the first threshold having the absolute value positively correlated with the actual torque of the motor 8. As illustrated in FIG. 2, the first threshold calculator 22 obtains the actual torque of the motor 8 calculated by the torque controller 25 from the torque controller 25. Based on the actual torque of the motor 8, the first threshold calculator 22 calculates an output power W from the power converter 12 in accordance with the expression (1) below. In the expression (1) below, N indicates the rotational speed of the motor 8, Trq indicates the actual torque of the motor 8, and $\eta_{TM}$ indicates the efficiency of the motor 8.

$$W=2\pi \times Trq \times N/\eta_{TM} \qquad (1)$$

Figure 4:
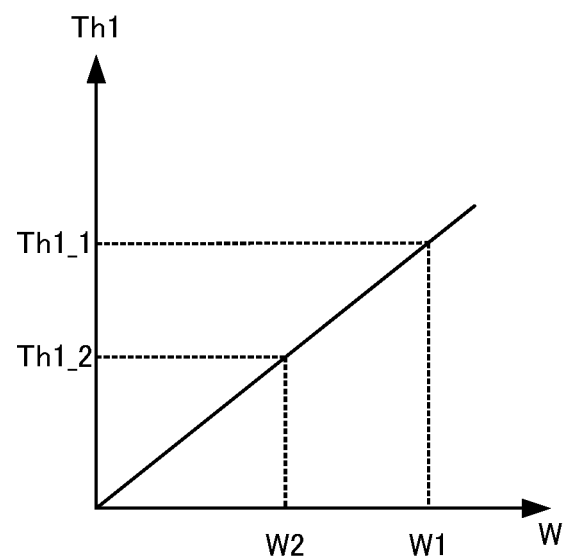
FIG. 4 illustrates exemplary first thresholds in Embodiment 1.

Based on the output power W, the first threshold calculator 22 calculates a first threshold. FIG. 4 illustrates exemplary first thresholds proportional to the output power W. In FIG. 4, the horizontal axis indicates the output power W from the power converter 12 and the vertical axis indicates the first threshold. The first threshold Th1 in the case of an output power W of W1 is defined as Th1_1 while the first threshold Th1 in the case of an output power W of W2 is defined as Th1_2 in FIG. 4. Here, Th1_1 is higher than Th1_2. The first threshold calculator 22 transmits the calculated first threshold Th1 to the separation determiner 23. In detail, the first threshold calculator 22 calculates the first threshold Th1 proportional to the output power W in accordance with the expression (2) below. In the expression (2) below, W indicates the output power from the motor 8 calculated in accordance with the above expression (1) after the delaying operation by the time element relay, $E_D$ indicates the voltage EFC after the delaying operation by the time element relay, $\eta_{INV}$ indicates the inverter efficiency, and C1 indicates the electrostatic capacity of the filter capacitor 11. The period delayed by the time element relay is adjusted to be longer than or equal to the unit time $\Delta T$, which is used in the above-explained calculation of the changing rate of the voltage EFC at the filter capacitor 11. In the expression (2) below, K indicates a positive coefficient smaller than or equal to 1, which is defined for adjusting the value of the first threshold Th1. Even when the pantograph 3 leaves the overhead wire 2 and causes a reduction in the voltage EFC at the filter capacitor 11, the time element relay maintains the first threshold Th1 to be the value before separation of the pantograph 3 from the overhead wire 2, during the determination whether the pantograph 3 is separate from the overhead wire 2.

$$Th1=K \times (1/C1) \times (W/(E_D \times \eta_{INV})) \qquad (2)$$

When the absolute value $|\Delta EFC/\Delta T|$ of the changing rate $\Delta EFC/\Delta T$ of the voltage at the filter capacitor 11 is greater than or equal to the first threshold Th1, the separation determiner 23 determines that the pantograph 3 is separate from the overhead wire 2. The separation determiner 23 then transmits a separation determination signal S2 to the torque controller 25 and the contactor controller 26. The separation determination signal S2 is set to a high (H) level in the case of determination that the pantograph 3 is separate from the overhead wire 2, and to a low (L) level in the case of determination that the pantograph 3 is not separate from the overhead wire 2. As the first threshold Th1 is proportional to the output power, accurate determination as to whether the pantograph 3 is separate from the overhead wire 2 can be achieved even when the changing rate $\Delta EFC/\Delta T$ of the voltage EFC at the filter capacitor 11 varies depending on the output power from the power converter 12.

The torque controller 25 calculates the actual torque of the motor 8 based on the phase currents flowing in the motor 8, which is obtained by the above-described current detector 10. The torque controller 25, during a period in which the separation determination signal S2 is at the L level, controls the operations of the switching elements of the power converter 12 such that the actual torque of the motor 8 approaches the target torque. In detail, the torque controller 25 outputs a switching control signal S1 to the switching elements of the power converter 12. In response to the separation determination signal S2 at the H level, the torque controller 25 reduces the target torque obtained from the target calculator 24 in a stepwise manner regardless of operation commands, and controls the operations of the switching elements of the power converter 12 such that the actual torque approaches the reduced target torque. The torque controller 25 reduces the target torque in a stepwise manner, as explained above, and finally turns off the switching elements of the power converter 12. In detail, the torque controller 25 outputs the switching control signal S1 that depends on the target torque reduced in a stepwise manner, to the switching elements of the power converter 12. After turning off the switching elements of the power converter 12, the torque controller 25 notifies the contactor controller 26 that the switching elements of the power converter 12 are turned off.

As explained above, the contactor 4 is closed while the contactor 5 is open during running of the electric railway vehicle. When the separation determination signal S2 is set to the H level and the contactor controller 26 is notified by the torque controller 25 that the switching elements of the power converter 12 are turned off during power running, then the contactor controller 26 opens the contactor 4. This operation results in the opening of both the contactors 4 and 5, so that the power converter 12 is electrically disconnected from the pantograph 3.

The configuration in which the power converter 12 is electrically disconnected from the pantograph 3 can suppress an inrush current from flowing to the power converter 12 and the motor 8 despite of recontact of the pantograph 3 with the overhead wire 2. The control of the control device 20 over the contactors 4 and 5 in the case of recontact of the pantograph 3 with the overhead wire 2 after separation of the pantograph 3 from the overhead wire 2 is identical to the above-explained control at the start of running of the electric railway vehicle.

Figure 5:
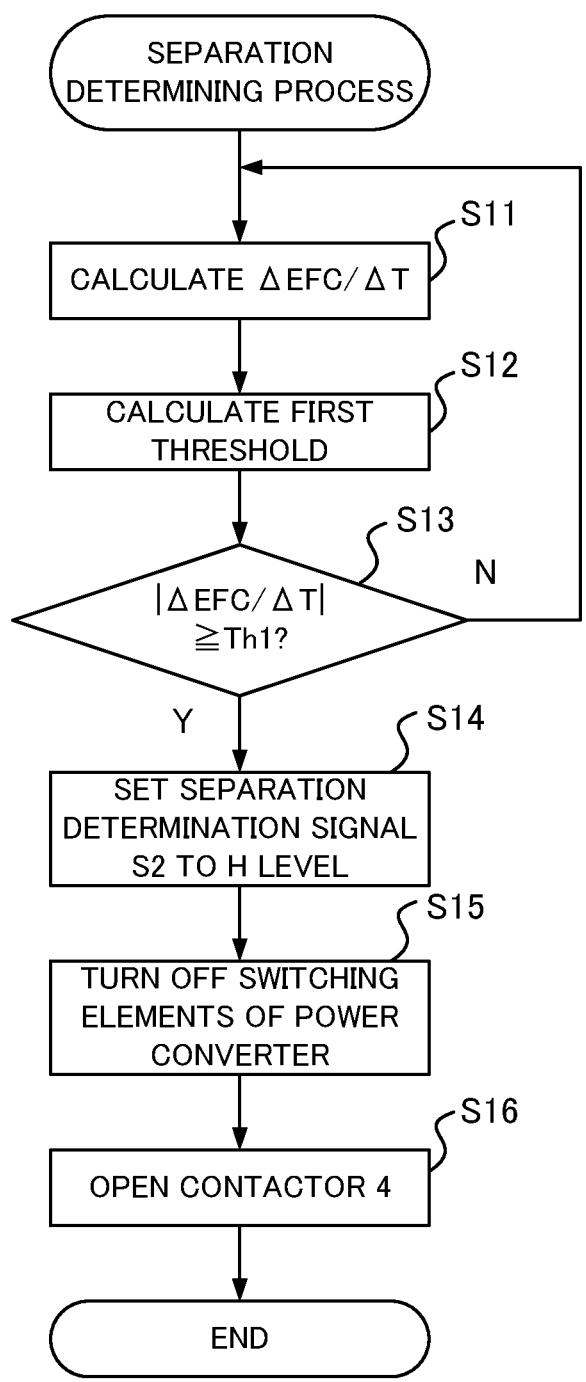
FIG. 5 is a flowchart illustrating exemplary operations of a separation determining process executed by the control device for a railway vehicle according to Embodiment 1.

The operations of the control device 20 having the above-described configuration are explained. In response to input of a power running command as an operation command from the cab of the electric railway vehicle, the target calculator 24 calculates a target torque of the motor 8, as explained above, and transmits the calculated target torque to the torque controller 25. The torque controller 25 then calculates an actual torque of the motor 8 and controls the operations of the switching elements of the power converter 12 such that the actual torque of the motor 8 is equal to the target torque. The input of a power running command as an operation command from the cab also initiates a separation determining process explained later, in parallel to the process executed by the torque controller 25. The separation determining process is explained with reference to FIG. 5.

The changing rate calculator 21 calculates a changing rate ΔEFC/ΔT of the voltage EFC at the filter capacitor 11 (Step S11). The first threshold calculator 22 calculates a first threshold Th1 having the absolute value positively correlated with the actual torque of the motor 8, based on the actual torque of the motor 8 (Step S12). The separation determiner 23 compares the absolute value |ΔEFC/ΔT| of the changing rate of the voltage EFC at the filter capacitor 11 with the first threshold Th1 (Step S13). When the absolute value |ΔEFC/ΔT| of the changing rate of the voltage EFC at the filter capacitor 11 is less than the first threshold Th1 (Step S13; N), the control device 20 repeats the above-explained steps. In contrast, when the absolute value |ΔEFC/ΔT| of the changing rate of the voltage EFC at the filter capacitor 11 is greater than or equal to the first threshold Th1 (Step S13; Y), the separation determiner 23 sets the separation determination signal S2 to the H level and transmits the separation determination signal S2 at the H level to the torque controller 25 and the contactor controller 26 (Step S14). When receiving the separation determination signal S2 at the H level, the torque controller 25 reduces the target torque in a stepwise manner and controls the operations of the switching elements of the power converter 12, and turns off the switching elements of the power converter 12 (Step S15). After turning off the switching elements of the power converter 12, the torque controller 25 notifies the contactor controller 26 of this situation. The contactor controller 26 notified that the switching elements of the power converter 12 are turned off opens the contactor 4 (Step S16). After completion of Step S16, the control device 20 terminates the separation determining process. The opening of the contactor 4 is followed by reclosing of the contactor 4 by the contactor controller 26, as explained above. Then, in response to input of a power running command as an operation command from the cab, the control device 20 resumes from Step S11.

As described above, the control device 20 according to Embodiment 1 uses the first threshold having the absolute value positively correlated with the actual torque of the motor 8 to determine whether the pantograph 3 is separate from the overhead wire 2. This configuration can achieve more accurate determination whether the pantograph 3 is separate from the overhead wire 2. In addition, the control device 20 opens the contactor 4 in response to determination that the pantograph 3 is separate from the overhead wire 2 during power running. This configuration can suppress an inrush current from flowing to the power converter 12 at the time of recontact of the pantograph 3 with the overhead wire 2.

Embodiment 2

Figure 6:
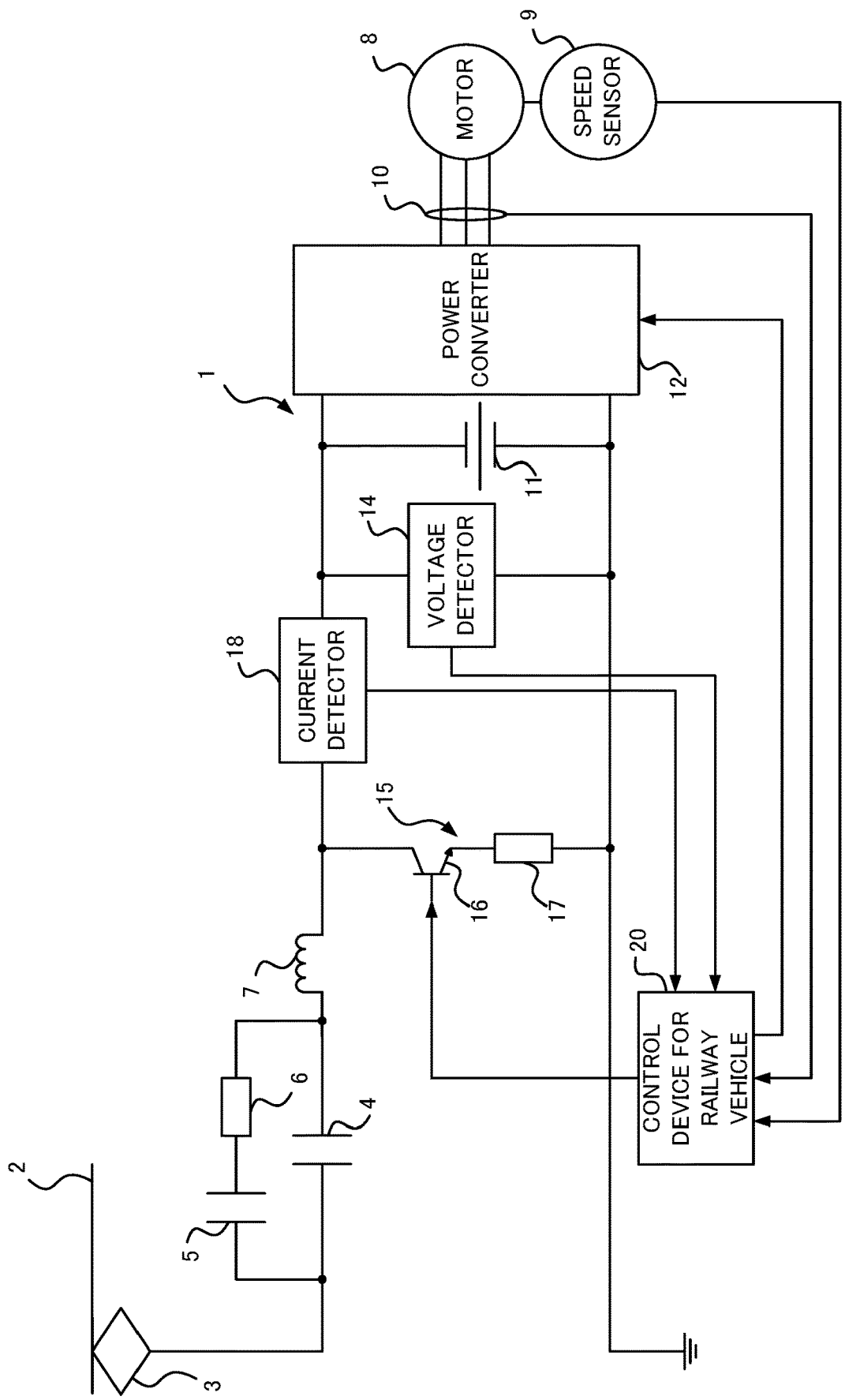
FIG. 6 is a block diagram illustrating a configuration of a power conversion system according to Embodiment 2 of the present disclosure.

According the above-described Embodiment 1, the determination whether the pantograph 3 is separate from the overhead wire 2 is conducted during power running. This determination, however, may also be conducted in the case where the operation commands include a braking command and the motor 8 functions as an electric generator, that is, in the case of regenerative braking. The description of Embodiment 2 is directed to the control device 20 for determining whether the pantograph 3 is separate from the overhead wire 2 during regenerative braking. Although the control device 20 determines whether the pantograph 3 is separate from the overhead wire 2 during regenerative braking in the description of Embodiment 2, this determination may also be conducted both during power running and during regenerative braking. With reference to FIG. 6, a power conversion system 1 according to Embodiment 2 is equipped with a chopper circuit 15, which is an exemplary step-down circuit for lowering the voltage at the filter capacitor 11. The power conversion system 1 according to Embodiment 2 differs from the power conversion system 1 according to Embodiment 1 in that the power conversion system 1 according to Embodiment 2 includes the chopper circuit 15 but excludes the voltage detector 13.

According to Embodiment 2, the power converter 12 conducts bidirectional power conversion between the primary and secondary sides. When the operation commands include a braking command, the control device 20 controls the operations of the switching elements of the power converter 12 to cause the power converter 12 to convert regenerated power occurred in the motor 8 into DC power. The power converter 12 supplies the DC power to a power conversion system 1 installed in another electric railway vehicle via the overhead wire 2. In order to achieve this power supply to a power conversion system 1 installed in another electric railway vehicle via the overhead wire 2, the voltage at the filter capacitor 11 is required to be higher than the voltage at the overhead wire 2. In contrast, an excessively high voltage at the filter capacitor 11 relative to the voltage at the overhead wire 2 causes overvoltage in the overhead wire 2. The voltage at the filter capacitor 11 thus needs be maintained within a desired range. In order to adjust the voltage at the filter capacitor 11, the chopper circuit 15 is connected in parallel to the power converter 12 on the primary side of the power converter 12. The chopper circuit 15 includes a switching element 16 and a braking resistor 17 connected in serial to each other. The switching element 16 switches the electrical path from the power converter 12 to the braking resistor 17. When the voltage EFC at the filter capacitor 11 during regenerative braking reaches or exceeds an initial voltage described later, the control device 20 activates the chopper circuit 15. The chopper circuit 15 is activated and thus consumes the output power from the power converter 12, resulting in a reduction in the voltage at the filter capacitor 11.

In the case where the pantograph 3 is not separate from the overhead wire 2 during regenerative braking, the chopper circuit 15 is activated when the voltage EFC at the filter capacitor 11 reaches or exceeds the initial voltage, so that the voltage at the filter capacitor 11 is maintained within the desired range. In contrast, at the time of separation of the pantograph 3 from the overhead wire 2 during regenerative braking, overvoltage may occur in the circuit closer to the pantograph 3 than the contactor 4 before arrival of the voltage EFC at the filter capacitor 11 at the initial voltage and activation of the chopper circuit 15, without any measure to suppress an increase in the voltage at the filter capacitor 11. The control device 20 therefore activates the chopper circuit 15 even when the voltage EFC at the filter capacitor 11 is lower than the initial voltage in the case where the control device 20 determines that the pantograph 3 is separate from the overhead wire 2 during regenerative braking.

Figure 7:
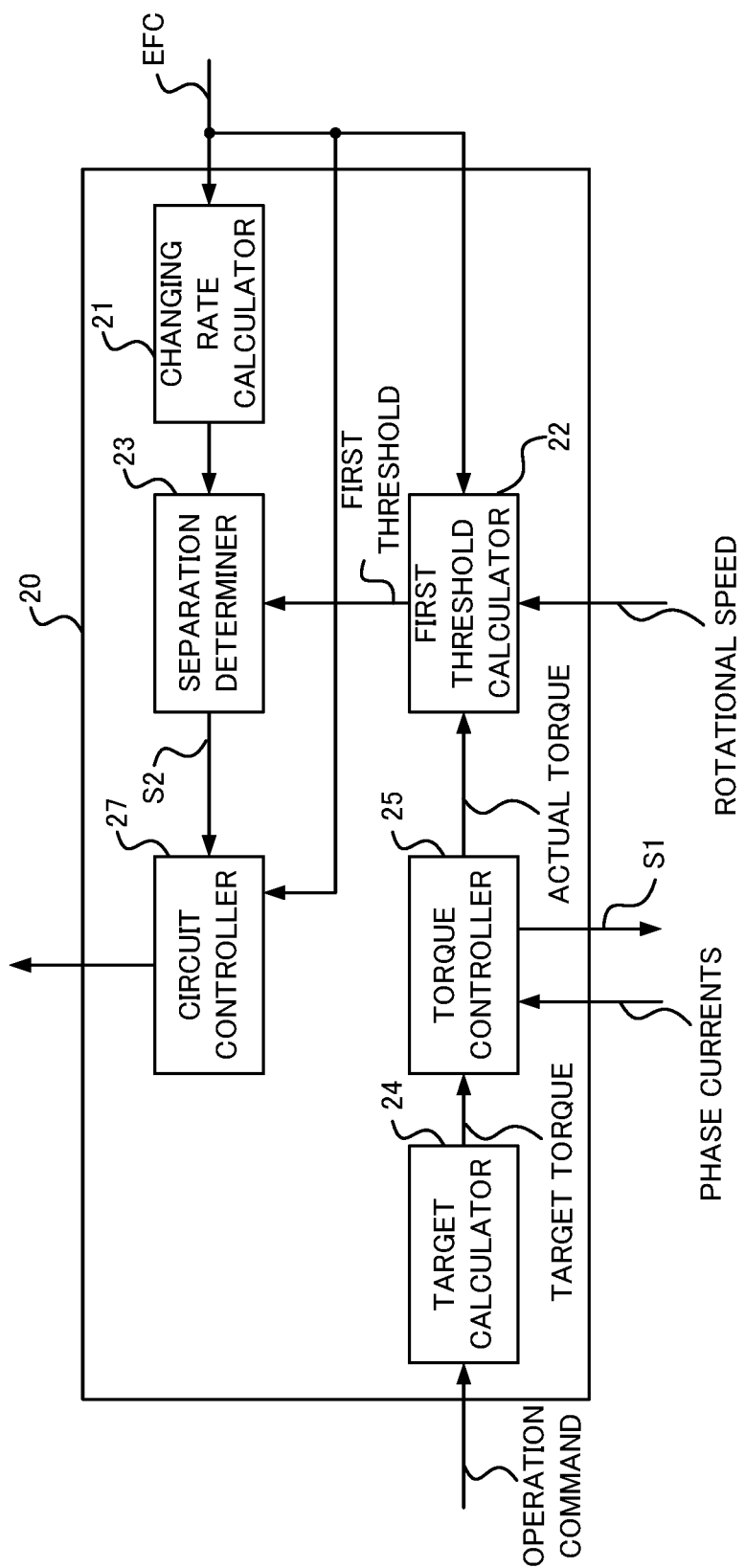
FIG. 7 is a block diagram illustrating a configuration of a control device for a railway vehicle according to Embodiment 2.

With reference to FIG. 7, the control device 20 includes a circuit controller 27 in place of the contactor controller 26 included in the control device 20 according to Embodiment 1. The changing rate calculator 21, the first threshold calculator 22, and the separation determiner 23 are identical to those according to Embodiment 1. The target calculator 24 calculates a target torque of the motor 8 required to achieve the target deceleration indicated by the braking command and transmits the calculated target torque to the torque controller 25. The torque controller 25 controls the operations of the switching elements of the power converter 12 such that the actual torque is equal to the target torque. The first threshold calculator 22 calculates a regenerated power W based on a rotational speed w and the target torque Trq during regenerative braking in accordance with the above expression (1), and then calculates a first threshold Th1 based on the regenerated power W in accordance with the above expression (2). During regenerative braking, the voltage at the filter capacitor 11 increases in contrast to FIG. 3. As the torque of the motor 8 increases, the changing rate $\Delta EFC/\Delta T$ of the voltage at the filter capacitor 11 also increases. Accordingly, the determination whether the pantograph 3 is separate from the overhead wire 2 can be conducted based on the first threshold Th1 having the absolute value positively correlated with the torque of the motor 8 and varying with time in response to a time variation in the torque of the motor 8, as in Embodiment 1. In accordance with the result of determination, the separation determiner 23 transmits the separation determination signal S2 to the circuit controller 27. The torque controller 25 controls the operations of the switching elements of the power converter 12 such that the actual torque is equal to the target torque during regenerative braking. According to Embodiment 2, the torque controller 25 does not receive the separation determination signal S2. In other words, the torque controller 25 does not turn off the switching elements of the power converter 12 despite of the determination that the pantograph 3 is separate from the overhead wire 2, in order to generate a desired regenerative braking force. The circuit controller 27 adjusts the conduction ratio of the switching element 16 depending on the conduction ratio in accordance with the voltage EFC at the filter capacitor 11.

Figure 8:
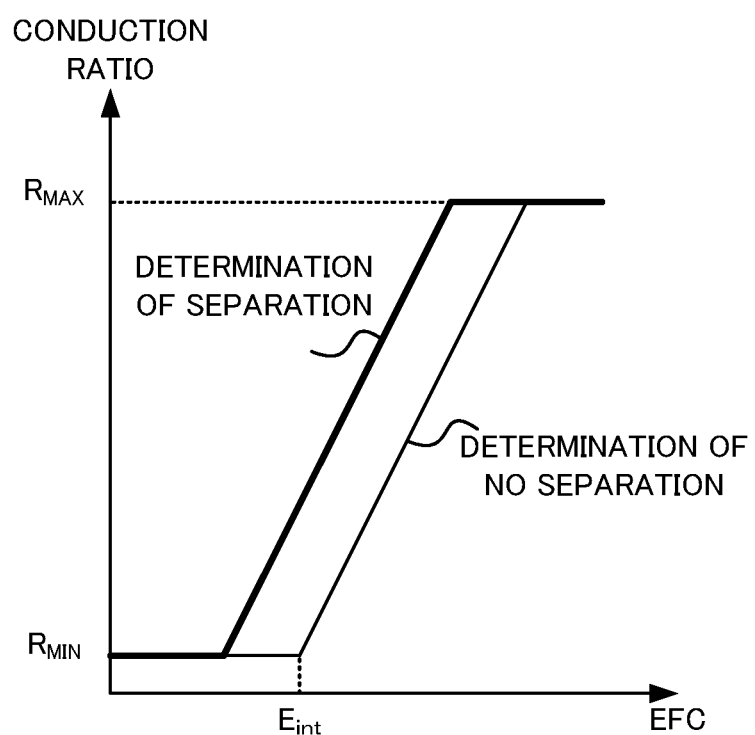
FIG. 8 illustrates exemplary conduction ratios at a chopper circuit in Embodiment 2.

When the pantograph 3 is not separate from the overhead wire 2, that is, when the separation determination signal S2 is at the L level, and the voltage EFC at the filter capacitor 11 is greater than or equal to the initial voltage $E_{int}$, then the circuit controller 27 adjusts the conduction ratio of the switching element 16 included in the chopper circuit 15. In detail, in response to arrival of the voltage EFC at the filter capacitor 11 at the initial voltage $E_{int}$ in the case of the separation determination signal S2 at the L level, the circuit controller 27 adjusts the conduction ratio of the switching element 16 to be the value higher than 0. In other words, when the voltage EFC at the filter capacitor 11 is lower than the initial voltage $E_{int}$, the switching element 16 is maintained to be turned off. The circuit controller 27 controls the switching element 16 at the conduction ratio in accordance with the voltage EFC at the filter capacitor 11, as represented by the thin solid line in FIG. 8. The conduction ratio in accordance with the voltage EFC at the filter capacitor 11 continuously varies depending on the voltage EFC at the filter capacitor 11 from the minimum conduction ratio $R_{MIN}$ to the maximum conduction ratio $R_{MAX}$. As represented by the thin solid line in FIG. 8, the conduction ratio increases from the minimum conduction ratio $R_{MIN}$ to the maximum conduction ratio $R_{MAX}$ in accordance with an increase in the voltage EFC at the filter capacitor 11. The initial voltage $E_{int}$ is defined depending on the allowable range of the voltage at the overhead wire.

In contrast, when the pantograph 3 leaves the overhead wire 2, that is, when the separation determination signal S2 is set to be the H level, then the circuit controller 27 activates the chopper circuit 15 regardless of the voltage EFC at the filter capacitor 11. In detail, in response to setting of the separation determination signal S2 to the H level, the circuit controller 27 controls the switching element 16 at the conduction ratio in accordance with the voltage EFC at the filter capacitor 11. As represented by the thick solid line in FIG. 8, the conduction ratio increases from the minimum conduction ratio $R_{MIN}$ to the maximum conduction ratio $R_{MAX}$ in accordance with an increase in the voltage EFC at the filter capacitor 11. The chopper circuit 15 is activated regardless of the voltage EFC at the filter capacitor 11. This configuration can activate the chopper circuit 15 immediately after separation of the pantograph 3 from the overhead wire 2 and thus suppress overvoltage in the circuit closer to the pantograph 3 than the contactor 4.

Provided that the voltage EFC at the filter capacitor 11 is constant, a conduction ratio between the minimum conduction ratio $R_{MIN}$ and the maximum conduction ratio $R_{MAX}$ in the case where the pantograph 3 is determined not to be separate from the overhead wire 2 is lower than a conduction ratio in the case where the pantograph 3 is determined to be separate from the overhead wire 2. The conduction ratio defined as explained above can suppress overvoltage in the circuit closer to the pantograph 3 than the contactor 4.

The operations of the control device 20 having the above-described configuration are explained. In response to input of a braking command as an operation command from the cab of the electric railway vehicle, the torque controller 25 controls the operations of the switching elements of the power converter 12 such that the actual torque is equal to the target torque, as explained above. The input of a braking command as an operation command from the cab also initiates a separation determining process explained later, in parallel to the process executed by the torque controller 25. The separation determining process is explained with reference to FIG. 9.

Figure 9:
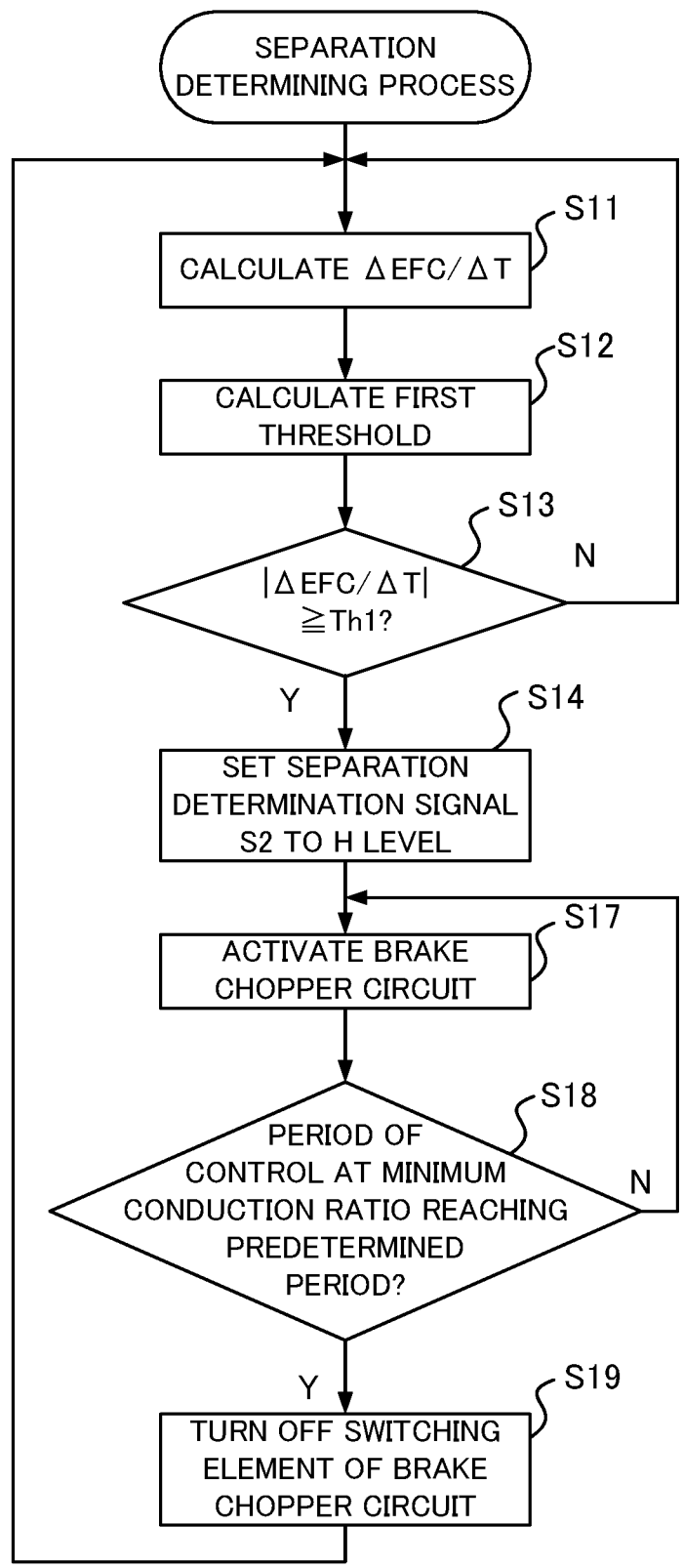
FIG. 9 is a flowchart illustrating exemplary steps of a separation determining process executed by the control device for a railway vehicle according to Embodiment 2.

Steps S11 to S13 in FIG. 9 are identical to those according to Embodiment 1. When the absolute value $|\Delta EFC/\Delta T|$ of the changing rate of the voltage EFC at the filter capacitor 11 is greater than or equal to the first threshold Th1 (Step S13; Y), the separation determiner 23 sets the separation determination signal S2 to the H level and transmits the separation determination signal S2 at the H level to the circuit controller 27 (Step S14). In response to reception of the separation determination signal S2 at the H level, the circuit controller 27 activates the chopper circuit 15 at the conduction ratio in accordance with the voltage EFC at the filter capacitor 11 (Step S17). When the period of operation of the chopper circuit 15 at the minimum conduction ratio is shorter than a predetermined period (Step S18; N), Step S17 is repeated. When the period of operation of the chopper circuit 15 at the minimum conduction ratio reaches or exceeds the predetermined period (Step S18; Y), the control device 20 turns off the switching element 16 of the chopper circuit 15 (Step S19) and the process returns to Step 11. The control device 20 repeats the above-explained separation determining process while a braking command is being input as an operation command.

As described above, the control device 20 according to Embodiment 2 activates the chopper circuit 15 in response to determination that the pantograph 3 is separate from the overhead wire 2 during regenerative braking, even when the voltage EFC at the filter capacitor 11 is lower than the reference voltage. This configuration can suppress overvoltage in the circuit closer to the pantograph 3 than the contactor 4.

Embodiment 3

Figure 10:
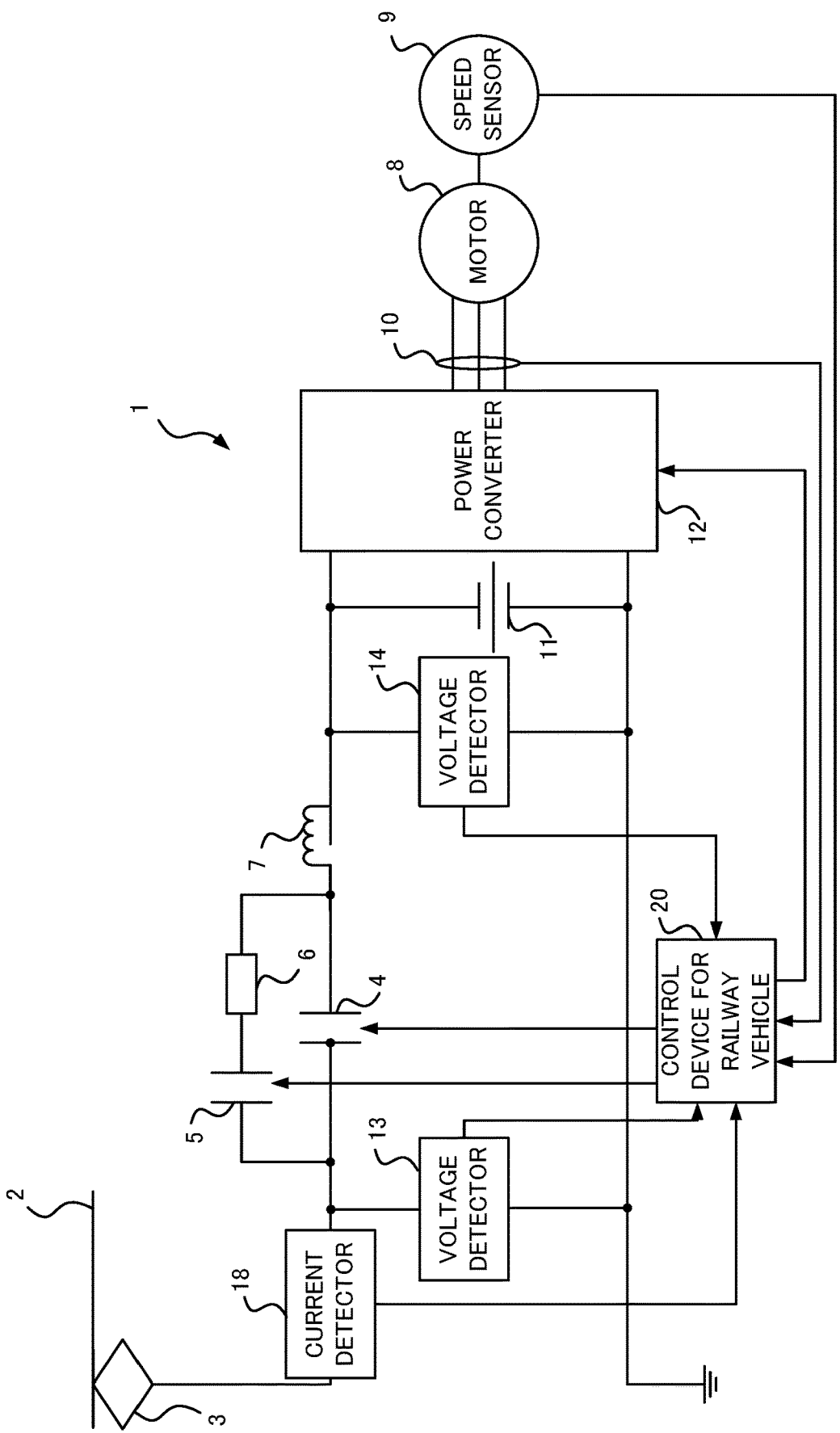
FIG. 10 is a block diagram illustrating a configuration of a power conversion system according to Embodiment 3 of the present disclosure.
Figure 11:
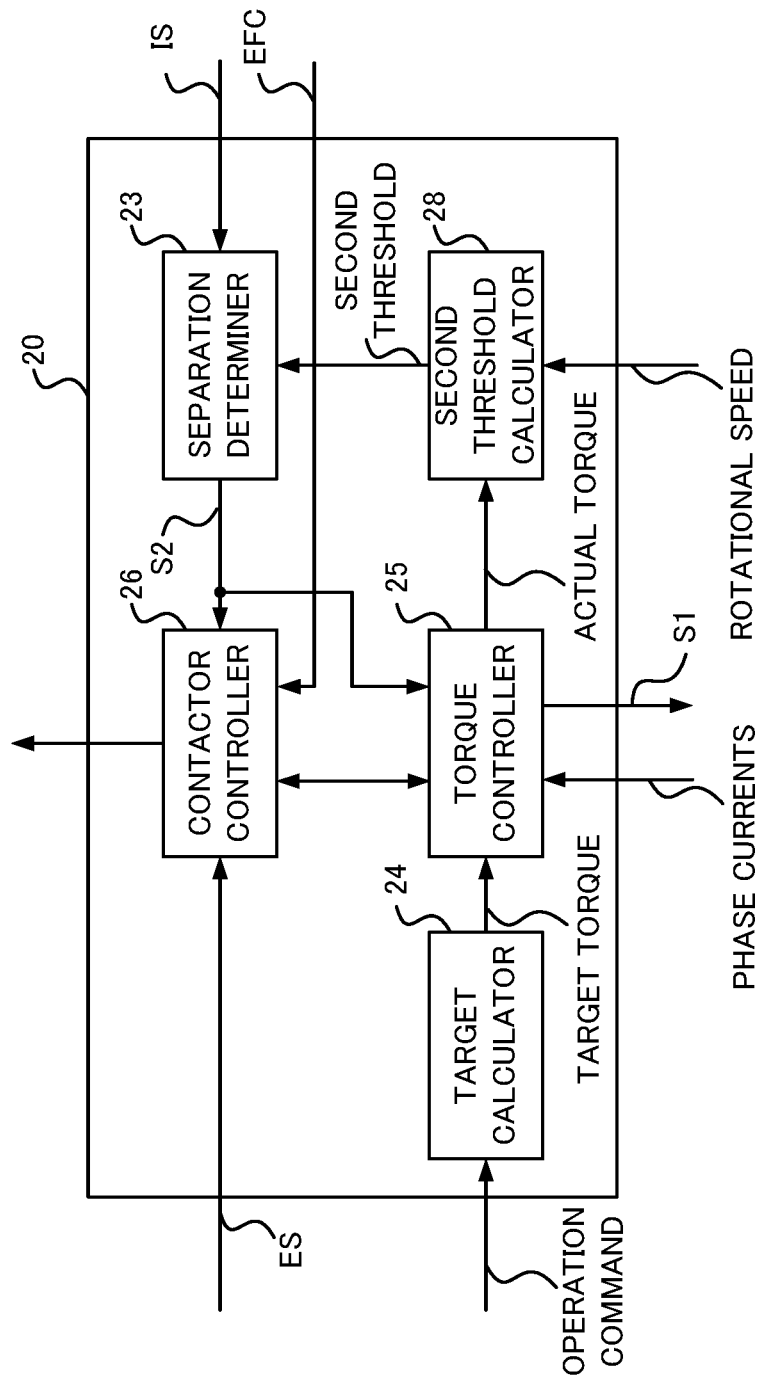
FIG. 11 is a block diagram illustrating a configuration of a control device for a railway vehicle according to Embodiment 3.

According to the above-described Embodiments 1 and 2, the changing rate of the voltage EFC at the filter capacitor 11 is used to determine whether the pantograph 3 is separate from the overhead wire 2. This determination procedure is a mere example. The determination whether the pantograph 3 is separate from the overhead wire 2 may be conducted using a current flowing from the pantograph 3 to the power converter 12 during power running. With reference to FIG. 10, a power conversion system 1 according to Embodiment 3 differs from the power conversion system 1 according to Embodiment 1 in that the power conversion system 1 according to Embodiment 3 includes a current detector 18. The control device 20 determines whether the pantograph 3 is separate from the overhead wire 2, based on an input current IS flowing from the pantograph 3 to the power converter 12, which is detected by the current detector 18, and based on a second threshold having the absolute value positively correlated with the torque of the motor 8 and varying with time in response to a time variation in the torque of the motor 8. With reference to FIG. 11, the control device 20 according to Embodiment 3 includes a second threshold calculator 28 in place of the first threshold calculator 22 and excludes the changing rate calculator 21.

The schematic configuration of the individual components of the control device 20 is described. After the start of running of the railway vehicle, the target calculator 24 calculates a target torque required to achieve the target acceleration indicated by the power running command, as in Embodiment 1. The torque controller 25 calculates an actual torque of the motor 8 and controls the operations of the switching elements of the power converter 12 such that the actual torque is equal to the target torque. The second threshold calculator 28 calculates a second threshold, which is a threshold for the input current IS. Based on the input current IS and the second threshold, the separation determiner 23 determines whether the pantograph 3 is separate from the overhead wire 2. When the separation determiner 23 determines that the pantograph 3 is not separate from the overhead wire 2, the torque controller 25 controls the operations of the switching elements of the power converter 12 such that the actual torque approaches the target torque, as explained above. In contrast, when the separation determiner 23 determines that the pantograph 3 is separate from the overhead wire 2, the torque controller 25 reduces the target torque in a stepwise manner, controls the operations of the switching elements of the power converter 12, and turns off the switching elements of the power converter 12, as in Embodiment 1. When the separation determiner 23 determines that the pantograph 3 is separate from the overhead wire 2, the contactor controller 26 opens the contactor 4. In the case where the pantograph 3 comes into contact with the overhead wire 2 again at the start of running of the electric railway vehicle, the contactor controller 26 controls the contactors 4 and 5, as in Embodiment 1.

Figure 12:
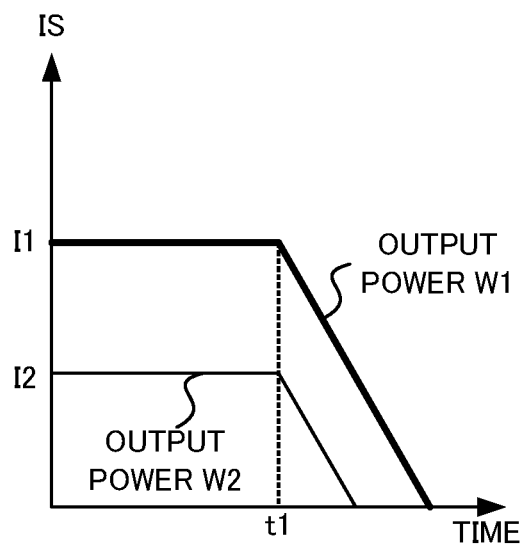
FIG. 12 illustrates exemplary currents flowing from a current collector to a power converter in Embodiment 3.

The detailed configuration of the individual components of the control device 20 is described. The separation determiner 23 determines whether the pantograph 3 is separate from the overhead wire 2 based on the input current IS and the second threshold calculated by the second threshold calculator 28. The variation in the input current IS is described with reference to FIG. 12. The example assumes that the pantograph 3 leaves the overhead wire 2 at time t1. In FIG. 12, the horizontal axis indicates time and the vertical axis indicates the input current IS. The thick solid line represents the input current IS in the case of an output power from the power converter 12 of W1 while the thin solid line represents the input current IS in the case of an output power of W2 in FIG. 12. Here, W1 is higher than W2.

In the case of an output power of W1, the input current IS until the time t1 is defined as I1. When the pantograph 3 leaves the overhead wire 2 at the time t1, the input current IS starts decreasing from I1. In contrast, in the case of an output power of W2, the input current IS until the time t1 is defined as I2. When the pantograph 3 leaves the overhead wire 2 at the time t1, the input current IS starts decreasing from I2 in the case of an output power of W2. When the determination whether the pantograph 3 is separate from the overhead wire 2 is conducted based on comparison between the input current IS and a fixed threshold, an error may occur. In a possible example in which the threshold is higher than I2 but lower than I1, although the pantograph 3 is determined to be separate from the overhead wire 2 in the case of an output power of W2, the pantograph 3 is determined not to be separate from the overhead wire 2 in the case of an output power of W1.

In order to avoid such an error, the control device 20 uses the second threshold having the absolute value positively correlated with the actual torque of the motor 8 to determine whether the pantograph 3 is separate from the overhead wire 2. The second threshold calculator 28 calculates the second threshold having the absolute value positively correlated with the actual torque of the motor 8. As illustrated in FIG. 11, the second threshold calculator 28 obtains the actual torque of the motor 8 from the torque controller 25. Based on the actual torque of the motor 8, the second threshold calculator 28 calculates an output power from the power converter 12 in accordance with the above expression (1). Based on the output power, the second threshold calculator 28 calculates the second threshold.

Figure 13:
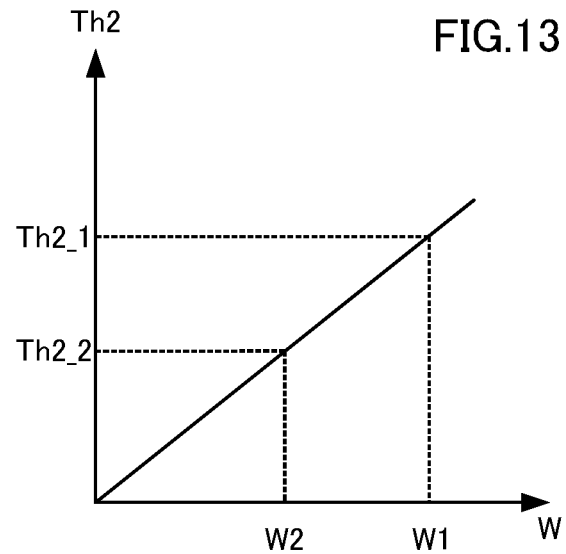
FIG. 13 illustrates exemplary second thresholds in Embodiment 3.

FIG. 13 illustrates exemplary second thresholds proportional to the output power W. In FIG. 13, the horizontal axis indicates the output power from the power converter 12 and the vertical axis indicates the second threshold. The second threshold Th2 in the case of an output power of W1 is defined as Th2_1 while the second threshold Th2 in the case of an output power of W2 is defined as Th2_2 in FIG. 13. Here, Th2_1 is higher than Th2_2. The second threshold calculator 28 transmits the calculated second threshold Th2 to the separation determiner 23. In detail, the second threshold calculator 28 calculates the second threshold Th2 proportional to the output power in accordance with the expression (3) below. In the expression (3) below, W indicates the output power calculated in accordance with the above expression (1), $E_D$ indicates the voltage EFC after the delaying operation by the time element relay, and $\eta_{INV}$ indicates the inverter efficiency. The period delayed by the time element relay is defined depending on the time available for the determination whether the pantograph 3 is separate from the overhead wire 2. For example, the delayed period is several tens of milliseconds. In the expression (3) below, K indicates a positive coefficient smaller than or equal to 1, which is defined for adjusting the value of the second threshold. The torque controller 25 controls the operations of the switching elements of the power converter 12 such that the actual torque is equal to the target torque immediately after separation of the pantograph 3 from the overhead wire 2 and start of decrease in the input current IS. The output power W is therefore maintained to be the value before separation of the pantograph 3 from the overhead wire 2, during the determination whether the pantograph 3 is separate from the overhead wire 2.

$$Th2=K\times(W/E_D\times\eta_{INV})) \quad (3)$$

When the input current IS is less than or equal to the second threshold Th2, the separation determiner 23 determines that the pantograph 3 is separate from the overhead wire 2. The separation determiner 23 then transmits a separation determination signal S2 to the torque controller 25 and the contactor controller 26. The separation determination signal S2 is set to the H level in the case of determination that the pantograph 3 is separate from the overhead wire 2, and to the L level in the case of determination that the pantograph 3 is not separate from the overhead wire 2. As the second threshold Th2 is proportional to the output power, accurate determination as to whether the pantograph 3 is separate from the overhead wire 2 can be achieved even when the value of the input current IS varies depending on the output power from the power converter 12.

The operations of the torque controller 25 and the contactor controller 26 are identical to those according to Embodiment 1. Also, the closing operation of the contactors 4 and 5 by the contactor controller 26 after opening of the contactor 4 is identical to that according to Embodiment 1.

Figure 14:
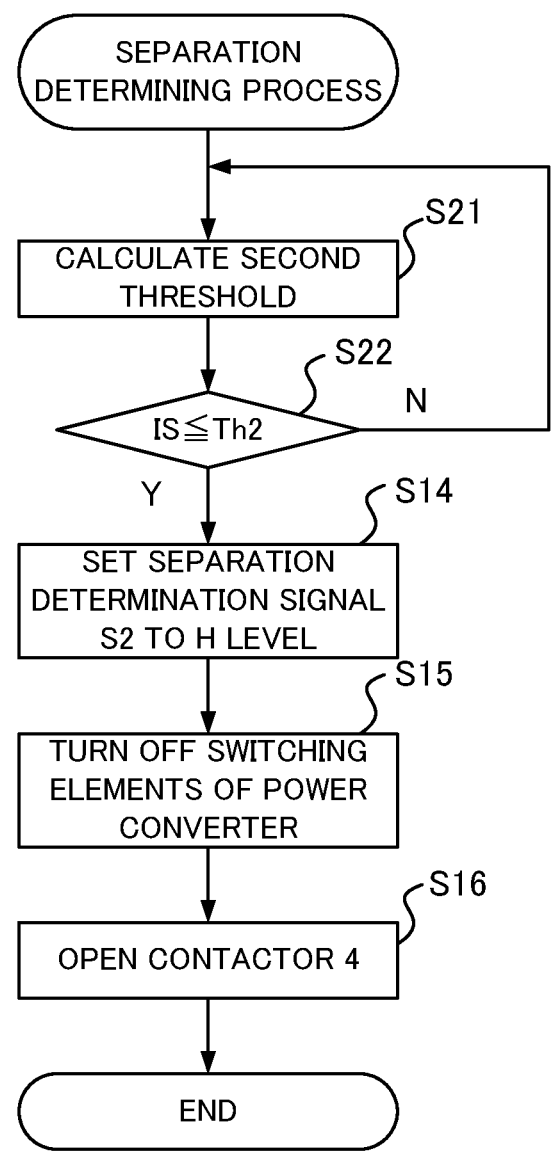
FIG. 14 is a flowchart illustrating exemplary steps of a separation determining process executed by the control device for a railway vehicle according to Embodiment 3.

The operations of the control device 20 having the above-described configuration are explained. In response to input of a power running command as an operation command from the cab of the electric railway vehicle, the target calculator 24 calculates a target torque of the motor 8, as in Embodiment 1. The torque controller 25 then calculates an actual torque of the motor 8 and controls the operations of the switching elements of the power converter 12 such that the actual torque is equal to the target torque. The input of a power running command as an operation command from the cab also initiates a separation determining process explained later, in parallel to the process executed by the torque controller 25. The separation determining process is explained with reference to FIG. 14. The second threshold calculator 28 calculates a second threshold having the absolute value positively correlated with the torque of the motor 8 (Step S21). The separation determiner 23 compares the input current IS with the second threshold (Step S22). When the input current IS is not less than or equal to the second threshold (Step S22; N), the control device 20 repeats Step S21. In contrast, when the input current IS is less than or equal to the second threshold (Step S22; Y), the separation determiner 23 sets the separation determination signal S2 to the H level and transmits the separation determination signal S2 at the H level to the torque controller 25 and the contactor controller 26 (Step S14). Steps S14 to S16 are identical to those according to Embodiment 1. After completion of Step S16, the control device 20 terminates the separation determining process. After opening of the contactor 4, the contactor controller 26 closes the contactor 4 again, as in Embodiment 1. Then, in response to input of a power running command as an operation command from the cab, the control device 20 resumes from Step S21.

As described above, the control device 20 according to Embodiment 3 uses the second threshold having the absolute value positively correlated with the torque of the motor 8 to determine whether the pantograph 3 is separate from the overhead wire 2. This configuration can achieve more accurate determination whether the pantograph 3 is separate from the overhead wire 2. In addition, the control device 20 opens the contactor 4 in response to determination that the pantograph 3 is separate from the overhead wire 2 during power running. This configuration can suppress an inrush current from flowing to the power converter 12 at the time of recontact of the pantograph 3 with the overhead wire 2.

Figure 15:
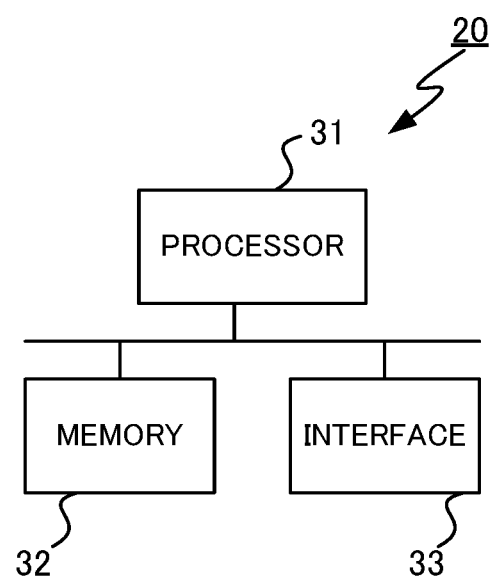
FIG. 15 illustrates a hardware configuration of a control device for a railway vehicle according to the embodiments.

FIG. 15 illustrates a hardware configuration of a control device for a railway vehicle according to any of the embodiments. The control device 20 for a railway vehicle has a hardware configuration for controlling the individual components. The hardware configuration includes a processor 31, a memory 32, and an interface 33. The individual functions of the device are achieved by execution of the program stored in the memory 32 by the processor 31. The interface 33 serves to connect devices to each other and establish communication. The interface 33 may include multiple types of interfaces, as required. Although the exemplary hardware configuration includes a single processor 31 and a single memory 32 in FIG. 15, the individual functions may also be achieved by cooperation of a plurality of processors 31 and a plurality of memories 32.

The above-illustrated hardware configurations and flowcharts are mere examples and may be arbitrarily modified and corrected.

The unit that includes the processor 31, the memory 32, and the interface 33 and serves as the center of control processes can be achieved by an ordinal computer system without a dedicated system. For example, the computer program for achieving the above-described functions may be stored in a non-transitory computer-readable recording medium (for example, flexible disk, CD-ROM, or DVD-ROM) for distribution and then installed in a computer to configure the control device 20 for a railway vehicle for executing the above-explained processes. Alternatively, the computer program may also be stored in a storage included in a server device on a communication network and downloaded into an ordinary computer system to configure the control device 20 for a railway vehicle.

In the case where the functions of the control device 20 for a railway vehicle are shared by an operating system (OS) and an application program or achieved by cooperation of the OS and the application program, only the components corresponding to the application program may be stored in a non-transitory recording medium or a storage.

Alternatively, the computer program may be superimposed on a carrier wave and distributed via a communication network. For example, the computer program may be posted on a bulletin board system (BBS) on a communication network and thus delivered via the communication network. In this case, when activated and executed under the control of the OS as well as other application programs, the computer program may enable the above-explained processes to be executed.

The power conversion system 1 may have any circuit configuration other than the above-described configurations. For example, the contactors 4 and 5 may be connected in serial to each other and the braking resistor 6 may be connected in parallel to the contactor 5. In this case, the contactors 4 and 5 are closed during power running. In response to detection of separation, the contactors 4 and 5 are both opened. When the voltage ES on the pantograph 3 side of the contactor 4 reaches or exceeds a reference voltage after detection of separation, only the contactor 4 is closed. Then, in response to a sufficient reduction in the difference between the voltage ES on the pantograph 3 side of the contactor 4 and the voltage EFC at the filter capacitor 11, the contactor 5 is closed.

The power conversion system 1 may obtain electric power using any system for obtaining electric power from a substation other than the above-explained overhead wire system. Examples of current collecting system include a surface collection system and a third rail system. In the surface collection system and the third rail system, electric power can be obtained when a contact shoe comes into contact with a third rail. In the overhead wire system, the current collector is any device for obtaining electric power from the overhead wire 2. Examples of current collector include a trolley pole and a bow collector. The motor 8 may also be a DC motor other than the AC motor.

The operation commands may further include a coasting command in addition to the power running command and the braking command. In the case where the operation commands include the coasting command, the control device 20 may detect separation, as in Embodiments 1 and 3. The control device 20 may have any configuration for detecting separation other than the above-described configurations. For example, a torque control device and a contactor control device, which perform the respective functions of the torque controller 25 and the contactor controller 26, may be provided independently from the control device 20. In this case, in response to detection of separation, the control device 20 notifies the torque control device and the contactor control device that the control device 20 has detected separation. Alternatively, a chopper control device, which performs the function of the circuit controller 27, may be provided independently from the control device 20, for example. In this case, the control device 20 notifies that the chopper control device that the control device 20 has detected separation.

The changing rate calculator 21 does not necessarily use the above-explained procedure to calculate a changing rate of the voltage EFC at the filter capacitor 11. The changing rate calculator 21 may use any procedure to calculate a changing rate of the voltage EFC at the filter capacitor 11. For example, the changing rate calculator 21 may acquire a regression line from the voltage EFC at the filter capacitor 11 every sufficiently short time Δt within a period of ΔT, and define the inclination of the regression line to be the changing rate of the voltage EFC at the filter capacitor 11.

The first threshold calculator 22 does not necessarily use the above-explained procedure to calculate a first threshold. The first threshold calculator 22 may use any procedure to calculate, using a physical quantity of which absolute value is positively correlated with the value corresponding to the output power from the power converter 12 and which varies with time in response to a time variation in the output power, a first threshold having the absolute value positively correlated with the physical quantity and varying with time in response to a time variation in the physical quantity. For example, the first threshold calculator 22 may calculate a first threshold based on the output power from the power converter 12, which is determined depending on a power running notch included in the operation commands. The physical quantity may be any physical quantity that is positively correlated with the output power from the power converter 12 and that varies with time in response to a time variation in the output power, other than the torque of the motor 8. Examples of physical quantity include a current at the motor 8, voltage at the motor 8, rotational speed of the motor 8, power running notch, input voltage to the power converter 12, and input current to the power converter 12. Alternatively, the physical quantity may be an estimated or calculated value or a target value other than the measured value.

The output power from the power converter 12 may be calculated by other procedure than the above-explained procedure. For example, the first threshold calculator 22 may calculate an output power from the power converter 12 based on a rotational frequency FM of the motor 8 in accordance with the expression (4) below. In the expression (4), P indicates the number of poles of the motor 8.

$$W = 2\pi \times 2FM/P \times Trq/\eta_{TM} \qquad (4)$$

Alternatively, the first threshold calculator 22 may calculate an output power from the power converter based on a voltage $V_M$ and a current $I_M$ at the motor 8 and a power factor PF of the motor 8 in accordance with the expression (5) below, for example.

$$W = \sqrt{3} \times V_M \times I_M \times PF \qquad (5)$$

The first threshold may be calculated in accordance with any table or function having the absolute value positively correlated with the torque of the motor 8. For example, the first threshold may be calculated in accordance with a linear function or quadratic function containing the output power from the power converter 12 as a variable. The first threshold according to Embodiment 1 may be a negative value having the absolute value positively correlated with the torque of the motor 8. In this case, the separation determiner 23 determines that the pantograph 3 is separate from the overhead wire 2 when the changing rate ΔEFC/ΔT at the filter capacitor 11 is less than or equal to the first threshold.

The operations of the separation determiner 23 according to Embodiments 1 and 2 are mere examples. For example, the first threshold Th1 may have a lower limit. Alternatively, the separation determiner 23 may repeat the comparison between the absolute value of the changing rate of the voltage EFC at the filter capacitor 11 and the first threshold at certain time intervals, and determine whether the pantograph 3 is separate from the overhead wire 2 based on the multiple results of comparison. For example, the separation determiner 23 may repeat the comparison between the absolute value of the changing rate of the voltage EFC at the filter capacitor 11 and the first threshold within a determination period of ten milliseconds, and determine that the pantograph 3 is separate from the overhead wire 2 when the absolute values of the changing rates of the voltages EFC at the filter capacitor 11 are greater than or equal to the first threshold in all the results of comparison. This configuration can prevent the determination whether the pantograph 3 is separate from the overhead wire 2 from being conducted based on an abnormal value and providing an incorrect result. Also, the operation of the separation determiner 23 according to Embodiment 3 is a mere example. For example, the separation determiner 23 may determine that the pantograph 3 is separate from the overhead wire 2 when an estimated input current IS is less than or equal to the second threshold. Alternatively, the separation determiner 23 may determine that the pantograph 3 is separate from the overhead wire 2 when the input current IS remains less than or equal to the second threshold for a certain time, for example, for ten milliseconds.

The chopper circuit 15 according to Embodiment 2, which is disposed closer to the pantograph 3 than the power converter 12, may be replaced with any step-down circuit. For example, the step-down circuit may be a switching regulator. The condition for inactivating the chopper circuit 15 according to Embodiment 2 is a mere example. For example, the configuration may further include a voltage detector 13, and the chopper circuit 15 may be inactivated depending on the voltage ES on the pantograph 3 side of the contactor 4 detected by the voltage detector 13. In detail, the chopper circuit 15 may be inactivated when the voltage ES on the pantograph 3 side of the contactor 4 remains within a desired range for at least a certain period.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Power conversion system for a railway vehicle
2 Overhead wire
3 Pantograph
4, 5 Contactor
6, 17 Braking resistor
7 Reactor
8 Motor
9 Speed sensor
10 Current detector
11 Filter capacitor
12 Power converter
13, 14 Voltage detector
15 Chopper circuit
16 Switching element
18 Current detector
20 Control device for a railway vehicle
21 Changing rate calculator
22 First threshold calculator
23 Separation determiner
24 Target calculator
25 Torque controller
26 Contactor controller
27 Circuit controller
28 Second threshold calculator
31 Processor
32 Memory
33 Interface
S1 Switching control signal
S2 Separation determination signal

The invention claimed is:

1. A control device for a railway vehicle to, in a power conversion system in which a power converter converts electric power supplied from a current collector to a primary side of the power converter and supplies the converted power to a motor connected to a secondary side of the power converter, determine whether the current collector is separate from a power line, the control device comprising:
   a changing rate calculator to obtain a voltage at the primary side of the power converter and calculate a changing rate of the voltage at the primary side;
   a first threshold calculator to calculate, using a physical quantity that is positively correlated with an output power from the power converter and varies with time in response to a time variation in the output power, a first threshold having an absolute value positively correlated with the physical quantity and varying with time in response to a time variation in the physical quantity;
   a separation determiner to compare the changing rate with the first threshold and determine whether the current collector is separate from the power line; and
   a torque controller to control switching elements of the power converter to control the output power from the power converter based on whether the current collector is separate from the power line.

2. The control device according to claim 1, further comprising:
   a circuit controller to control a step-down circuit connected to the primary side of the power converter, the power converter conducting bidirectional power conversion between the primary side and the secondary side, wherein
   the circuit controller obtains an operation command including a power running command or a braking command to the railway vehicle, and activates the step-down circuit when the operation command includes the braking command and the voltage at the primary side is equal to or higher than an initial voltage, and
   when the separation determiner determines that the current collector is separate from the power line, the circuit controller activates the step-down circuit, even when the voltage at the primary side is lower than the initial voltage.

3. The control device according to claim 2, wherein
   the step-down circuit includes a switching element and a resistor connected in serial to each other,
   the switching element opens or closes an electrical path from the power converter to the resistor,
   when the voltage at the primary side is equal to or higher than the initial voltage, the circuit controller controls the switching element of the step-down circuit at a conduction ratio positively correlated with the voltage at the primary side, and
   when the separation determiner determines that the current collector is separate from the power line, the circuit controller controls the switching element of the step-down circuit at the conduction ratio positively correlated with the voltage at the primary side, even when the voltage at the primary side is lower than the initial voltage.

4. The control device according to claim 3, wherein
   the conduction ratio of the switching element of the step-down circuit increases from a minimum conduction ratio to a maximum conduction ratio in accordance with an increase in the voltage at the primary side, and
   provided that the voltage at the primary side is constant, the conduction ratio in accordance with the voltage at the primary side in a case where the separation determiner determines that the current collector is not separate from the power line is lower than the conduction ratio in accordance with the voltage at the primary side in the case where the separation determiner determines that the current collector is separate from the power line, both of the conduction ratios being higher than the minimum conduction ratio and lower than the maximum conduction ratio.

5. The control device according to claim 4, wherein
the torque controller is configured to obtain an operation command including a power running command or a braking command from the railway vehicle, and control operations of switching elements included in the power converter under the operation command and thereby adjust a torque of the motor, wherein
when the operation command includes the power running command and the separation determiner determines that the current collector is separate from the power line, the torque controller reduces a target torque.

6. The control device according to claim 5, further comprising:
a contactor controller to obtain the operation command and to, when the operation command includes the power running command and the separation determiner determines that the current collector is separate from the power line, open a contactor disposed between the current collector and the power converter after the torque controller reduces the target torque.

7. The control device according to claim 2, wherein the absolute value of the first threshold has a lower limit.

8. The control device according to claim 3, wherein
the torque controller is configured to obtain an operation command including a power running command or a braking command from the railway vehicle, and control operations of switching elements included in the power converter under the operation command and thereby adjust a torque of the motor, wherein
when the operation command includes the power running command and the separation determiner determines that the current collector is separate from the power line, the torque controller reduces a target torque.

9. The control device according to claim 8, further comprising:
a contactor controller to obtain the operation command and to, when the operation command includes the power running command and the separation determiner determines that the current collector is separate from the power line, open a contactor disposed between the current collector and the power converter after the torque controller reduces the target torque.

10. The control device according to claim 1, wherein the absolute value of the first threshold has a lower limit.

11. The control device according to claim 2, wherein
the torque controller is configured to obtain an operation command including a power running command or a braking command from the railway vehicle, and control operations of switching elements included in the power converter under the operation command and thereby adjust a torque of the motor, wherein
when the operation command includes the power running command and the separation determiner determines that the current collector is separate from the power line, the torque controller reduces a target torque.

12. The control device according to claim 11, further comprising:
a contactor controller to obtain the operation command and to, when the operation command includes the power running command and the separation determiner determines that the current collector is separate from the power line, open a contactor disposed between the current collector and the power converter after the torque controller reduces the target torque.

13. The control device according to claim 1, wherein
the torque controller is configured to obtain an operation command including a power running command or a braking command from the railway vehicle, and control operations of switching elements included in the power converter under the operation command and thereby adjust a torque of the motor, wherein
when the operation command includes the power running command and the separation determiner determines that the current collector is separate from the power line, the torque controller reduces a target torque.

14. The control device according to claim 10, wherein
the torque controller is configured to obtain an operation command including a power running command or a braking command from the railway vehicle, and control operations of switching elements included in the power converter under the operation command and thereby adjust a torque of the motor, wherein
when the operation command includes the power running command and the separation determiner determines that the current collector is separate from the power line, the torque controller reduces a target torque.

15. The control device according to claim 14, further comprising:
a contactor controller to obtain the operation command and to, when the operation command includes the power running command and the separation determiner determines that the current collector is separate from the power line, open a contactor disposed between the current collector and the power converter after the torque controller reduces the target torque.

16. The control device according to claim 13, further comprising:
a contactor controller to obtain the operation command and to, when the operation command includes the power running command and the separation determiner determines that the current collector is separate from the power line, open a contactor disposed between the current collector and the power converter after the torque controller reduces the target torque.

17. A control device for a railway vehicle to, in a power conversion system in which a power converter converts electric power supplied from a current collector to a primary side of the power converter into alternating-current (AC) power and supplies the AC power to a motor connected to a secondary side of the power converter, determine whether the current collector is separate from a power line, the control device comprising:
a threshold calculator to calculate, using a physical quantity that is positively correlated with an output power from the power converter and varies with time in response to a time variation in the output power, a threshold having an absolute value positively correlated with the physical quantity and varying with time in response to a time variation in the physical quantity;
a separation determiner to compare a current flowing from the current collector to the power converter with the threshold and determine whether the current collector is separate from the power line; and
a torque controller to control switching elements of the power converter to control the output power from the power converter based on whether the current collector is separate from the power line.

18. The control device according to claim 17, wherein
the torque controller is configured to obtain an operation command including a power running command or a braking command from the railway vehicle, and control operations of switching elements included in the power converter under the operation command and thereby adjust a torque of the motor, wherein when the operation command includes the power running command and the separation determiner determines that the current collector is separate from the power line, the torque controller reduces a target torque.

19. The control device according to claim 18, further comprising:

a contactor controller to obtain the operation command and to, when the operation command includes the power running command and the separation determiner determines that the current collector is separate from the power line, open a contactor disposed between the current collector and the power converter after the torque controller reduces the target torque.

20. A method of determining separation executed by a control device for a railway vehicle, the method comprising:

comparing, by a control device, (i) a voltage at a primary side of a power converter or a current flowing from a current collector to the power converter and (ii) a threshold having an absolute value positively correlated with an output power from the power converter and varying with time in response to a time variation in the output power, the primary side of the power converter being supplied with electric power from the current collector, the current collector obtaining the electric power from a power source via a power line;

determining, by the control device, whether the current collector is separate from the power line; and controlling, by the control device, switching elements of the power converter to control the output power from the power converter based on whether the current collector is determined to be separate from the power line.

* * * * *